No. 674,048. Patented May 14, 1901.
E. R. WETHERED.
BRIDLE.
(Application filed June 10, 1897.)
(No Model.)
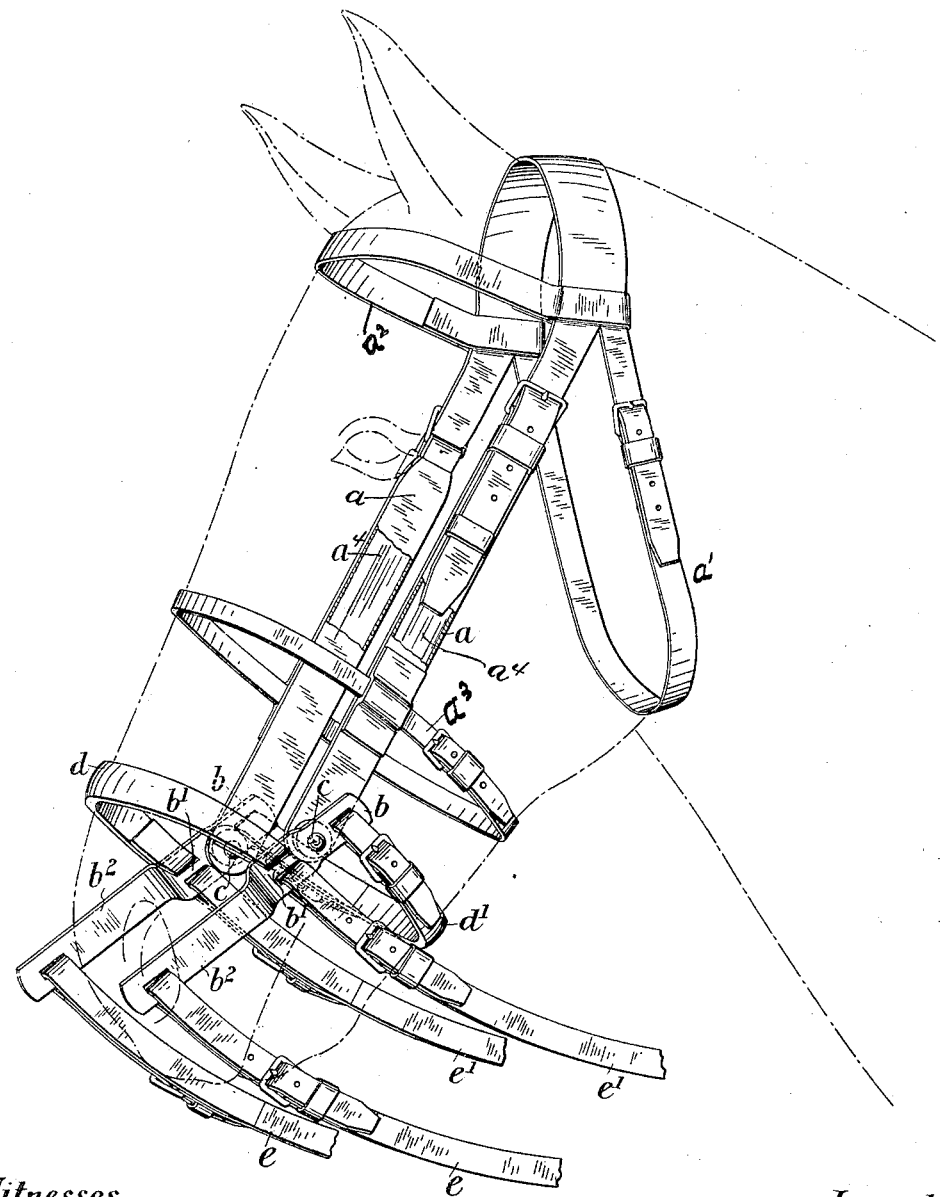
Witnesses
Inventor

UNITED STATES PATENT OFFICE.

EDWIN ROBERT WETHERED, OF LEE, ENGLAND.

BRIDLE.

SPECIFICATION forming part of Letters Patent No. 674,048, dated May 14, 1901.

Application filed June 10, 1897. Serial No. 640,244. (No model.)

*To all whom it may concern:*

Be it known that I, EDWIN ROBERT WETHERED, a subject of the Queen of Great Britain, residing at Lee, in the county of Kent, England, have invented new and useful Improvements in Means for Controlling and Driving Horses without Bit or Curb, of which the following is a specification.

My invention relates to improvements in means for controlling and driving horses without the use of the bit or curb adapted to be placed in the mouth of the animal.

To this end my invention consists in a bitless bridle having pivoted to the lower ends of the side or cheek straps a pair of levers having attached thereto upon one side of their fulcrums a jaw-strap adapted to engage under the lower jaw of the animal and on the other side of the fulcrums a nose-strap adapted to engage over the animal's nose, which straps are adapted to be tightened around the animal's nose and jaw by means of the driving lines or reins attached to the long arms of the levers. The side or cheek straps are attached to the headstall and form a part of it, as in the ordinary bridle, but are stiffened with wood or metal strips in order to adapt them to carry at their lower ends and to provide fulcrums for the metal levers pivoted thereto, which carry the jaw and nose straps and to which the driving-lines are attached. The ends of the jaw-strap are attached, respectively, to the short arm of each lever above the pivot, while the nose-strap is attached to the levers below the pivots, at about the same distance therefrom. The driving-lines are attached to the ends of the long arms of the levers. The driving-lines may also be attached to a point nearer the pivot or opposite the point of attachment of the nose-strap, or two pairs of lines may be used, according as the horse may be easy or difficult to control under different circumstances.

In the accompanying drawing I have shown in perspective view a bridle having my improvements and attached to a horse's head, a portion of each cheek-strap being broken away to expose the stiffening-strips.

The headstall, of which the cheek-straps $a\ a$, throat-latch $a'$, and front $a^2$ form parts, as in the ordinary bridle, is placed upon the horse's head. The cheek-straps, however, in my bridle are stiffened with wood or metal strips $a^4$ or in any other suitable way. As here shown, the stiffening-strips are covered by the usual leather of the cheek-straps. The headstall is supplemented by the strap $a^3$ around the horse's head, which serves to hold the cheek-straps still firmer in position to serve as fulcrums for the levers. The levers $b\ b^2\ b\ b^2$ are pivoted to the cheek-straps $a\ a$ at $c\ c$. To the short arms $b\ b$ of the levers above the pivots are attached the ends of the jaw-strap $d'$, which strap extends from the ends of the levers around under the jaw of the animal and is adjusted there to the proper length. To the levers upon the opposite side of the pivots $c\ c$, at about the same distance therefrom as the jaw-strap, the nose-strap $d$ is attached at $b'$ and is adjusted at the proper length over the horse's nose. The long arms $b^2$ of the levers extend downward, and to their ends are attached the driving-lines $e\ e$. There may also be used a second pair of driving-lines attached nearer the pivots, as shown by $e'\ e'$, attached to the levers near $b'\ b'$. The long arms of the levers are bent outward below the points $b'\ b'$ and extend downward at a greater distance apart than at their pivotal points, so that they may not chafe the horse's nose.

With this bridle constructed as described it will be obvious that by pulling upon the driving-lines $e\ e$ the jaw-strap and nose-strap are drawn tightly together around the horse's mouth. As the lines are attached at a considerable distance from the fulcrums, a powerful leverage action is obtained, which is exerted in gripping the nose and jaw of the animal. By this means the most fractious and unruly horse can be controlled without injury to the horse's mouth, as is the case frequently when the bit or curb is used.

Having thus described my invention, what I claim as new, and desire to secure by Letters Patent, is—

In a bitless bridle, the combination with stiffened cheek-straps, of levers each of which is pivoted directly to the lower end of its respective stiffened cheek-strap, a strap as $a^3$ for encircling the animal's head and engaging the stiffened cheek-straps for holding said cheek-straps to the animal's head, a jaw-strap connected to the ends of the levers above the fulcrums and adapted to extend under the lower jaw of the animal, and a nose-strap connected to the levers on the other side of the fulcrums and adapted to extend over the nose of the animal, the long arms of said levers extending below the point of attachment of the nose-strap, and a pair of driving-lines connected to the long arms of the levers and adapted when pulled to turn the levers on their fulcrums and thus grip the animal's nose between the jaw and nose straps.

EDWIN ROBERT WETHERED.

Witnesses:
G. F. REDFERN,
JOHN E. BOUSFIELD.